(12) United States Patent
McDonald

(10) Patent No.: US 12,509,889 B1
(45) Date of Patent: Dec. 30, 2025

(54) PANELIZED WALL INSTALLATION CART

(71) Applicant: William D McDonald, Santa Rosa, CA (US)

(72) Inventor: William D McDonald, Santa Rosa, CA (US)

(*) Notice: Subject to any disclaimer, the term of this patent is extended or adjusted under 35 U.S.C. 154(b) by 0 days.

(21) Appl. No.: 18/963,752

(22) Filed: Nov. 28, 2024

Related U.S. Application Data

(63) Continuation-in-part of application No. 18/360,250, filed on Jul. 27, 2023, now abandoned.

(60) Provisional application No. 63/392,717, filed on Jul. 27, 2022.

(51) Int. Cl.
*E04F 21/18* (2006.01)
*B62B 3/10* (2006.01)

(52) U.S. Cl.
CPC .................................. *E04F 21/18* (2013.01)

(58) Field of Classification Search
CPC ... E04F 21/1822; E04F 21/1805; E04F 21/18; E04F 21/1894; B62B 1/268; B62B 3/108; B62B 2203/05; B62B 2203/70; B62B 2206/02
USPC ................................................ 414/10, 11, 12
See application file for complete search history.

(56) References Cited

U.S. PATENT DOCUMENTS

| | | | | |
|---|---|---|---|---|
| 1,996,387 | A * | 4/1935 | Owen | B65G 49/067 225/96.5 |
| 3,540,753 | A * | 11/1970 | Hanson | E04G 21/167 254/3 R |
| 3,790,003 | A * | 2/1974 | Tausheck | B65G 49/067 414/737 |
| 3,954,189 | A * | 5/1976 | Sherritt | B60P 3/00 414/11 |
| 4,815,395 | A * | 3/1989 | Trueg | C03B 33/03 269/910 |
| 7,114,784 | B1 * | 10/2006 | Blumenstein | B60P 1/28 298/21 V |
| 7,628,408 | B2 * | 12/2009 | Kolesa | B62B 3/08 280/654 |
| 10,100,541 | B1 * | 10/2018 | Widjaja | E04F 21/1816 |
| 2008/0273953 | A1 * | 11/2008 | Bodem | B66F 9/06 414/382 |
| 2020/0307666 | A1 * | 10/2020 | Soler Balcells | B62B 3/02 |

* cited by examiner

*Primary Examiner* — Gregory W Adams
(74) *Attorney, Agent, or Firm* — Gary Hoenig

(57) ABSTRACT

A panelized wall transportation and installation cart is provided comprising a horizontally disposed rectangular cart frame assembly having wheels fixed to the bottom of the frame. The cart frame assembly further comprises a front and rear sections, the rear section being slidably received by the front section thereby facilitating adjustment of the length of the base frame. The cart has panel guide rails with panel clamps fixed to the top of the rails. The panel rails being rotatable around the front end of the cart are rotated vertically by struts as the cart frame assembly shortens. The panel rails are first positioned horizontally on the cart frame assembly with the top of a user provided secured by the panel clamps. The panel rails are rotated vertically thereby bringing the user provided panel into position for installation.

7 Claims, 2 Drawing Sheets

PANELIZED WALL INSTALLATION CART

This non-provisional continuation in part utility patent application, filed in the United States Patent and Trademark Office, claims the benefit of U.S. Non-Provisional patent application Ser. No. 18/360,250 filed Jul. 27, 2023 that in turn claims the benefit of U.S. Provisional Patent Application Ser. No. 63/392,717 filed Jul. 27, 2022 and are hereby incorporated by reference.

FIELD OF THE INVENTION

The invention relates to the construction industry and building materials installation tools; and, more particularly to a panelized wall transport and installation cart for manipulating, positioning and installing panelized wall elements.

BACKGROUND OF THE INVENTION

Panelized wall construction utilize premanufactured wall elements are typically shipped to a construction site stacked horizontally on pallets. During construction the flat panel elements are transported from the pallets one by one to the point of installation, manipulated to orient the panel vertically, positioned where required and fastened into place. Handling and installation of lightweight wall construction panel elements such as drywall and plywood can be manipulated manually; however, heavier premanufactured wall elements such as utilized in structural insulated panels (SIPs) and hollow wall dual panel construction are typically heavy and require a crane or many workers to transport, manipulate, position and fasten the panels into place. Installation of hollow wall construction panels is further complicated by the necessity to install an outside panel element first and then an inside panel element. A crane can be used for positioning panels, the technique typically implemented during SIPs construction; however, cranes are expensive and can only be used from outside of the structure thereby limiting their utility. There are similar restrictions experienced when installing hollow wall panels. Manipulation and installation of heavy panels by workers becomes awkward and can be dangerous. Regarding hollow wall construction panels, exterior walls are typically manipulated and positioned from the inside of the structure wherein the outside panel element is first installed and then the inside panel. Installation of the exterior panels from the inside also eliminates the need to install from the outside of the structure thereby negating the need for scaffolding particularly in multi-story construction.

Therefore, what is needed is a panelized wall installation apparatus to transport individual panel elements from delivery pallets to the installation site and manipulate and orient the panel into position for final fastening whilst requiring minimal labor while also being safe and cost effective.

SUMMARY OF THE INVENTION

Accordingly, the present invention is directed to a panelized wall installation cart having at least two panel guide rails rotatably disposed along a cross guide bar forming the front of a horizontally disposed rectangular shaped cart frame assembly. The panel guide rails have panel clamps mounted to the top of the guide disposed to attach to the top of a user provided panelized wall element. The panel guide rails are rotated to a horizontal position to facilitate loading a panelized wall element onto the cart. The panel clamps are closed to grasp the panelized wall element. The panel clamps are electrically activated as is the positioning of a clamp lever fixed between the panel clamp and the top of the panel guide rail. Wheels are provided fixed to the bottom of the cart frame assembly for rolling the panelized wall element to an installation location. The operator rotatably lifts the panel guide rails to a vertical position and adjusts the clamp lever assembly at the top of the panel guide rails to cantilever the panel out and away from the panel guide rails to achieve the installation positioning. The cart has features to adjust the vertical and horizontal lateral positioning of the panel relative to the cart so as to provide precise installation positioning. Lifting struts disposed between the cart frame assembly and the panel guide rails push and thereby rotate the panel guide rails into a vertical position. The distal ends of the lifting struts are pivotally disposed along the panel guides whilst the proximate ends are pivotally disposed along the rear support assembly of the cart frame assembly. The rear support assembly is drawn towards the front of the cart frame assembly by a motor driven longitudinal positioning apparatus being a rack and pinon gearing, sprocket and chain, linear actuator, or hydraulic cylinder thereby shortening the longitudinal length of the cart frame assembly, forcing the lifting struts forward and rotating the panel guide rails to a vertical position. The strut proximate ends are further slidably disposed along the rear support assembly and the bottom ends of the panel guide rails have mounts that provide slidable connectivity along the front cross bar thereby providing side to side positioning relative to the cart frame assembly. Side to side positioning may be performed manually however a power driven lateral positioning apparatus being a chain, cable, hydraulic cylinder, or linear actuator is provided. An operator handle fixed to the panel guide rails and extending to the rear is provided to assist maneuvering the position of the cart. The operator handle assembly locks in position relative to the pane guide rails when in the lifting transport position bringing the panel guide rails to about 70 degrees relative to the cart frame assembly making maneuvering the cart around the job site. The bottom ends of the panel guide rails interfere with the ground surface when the panel guide rails are rotated to the vertical installation position thereby securing the cart in position during installation of the user provided panelized wall element. The operator handle also comprises a user interface for controlling the power driven elements.

For transport convenience, articulations in the panel guide rails and operator handle assembly as well as detachable fittings on the lifting struts are provided to fold the cart into a transportable size.

An objective of the present invention is to reduce the man power required to install panelized wall elements and to provide a safe and efficient installation tool. In combination with the various features provided, the present invention overcomes many of the disadvantages of the prior art.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings.

DETAILED DESCRIPTION OF THE INVENTION

Although particular embodiments of the invention have been described in detail for purposes of illustration, various modifications may be made without departing from the spirit and scope of the invention. Where examples are presented to illustrate aspects of the invention, these should not be taken as limiting the invention in any respect.

Figure 1:
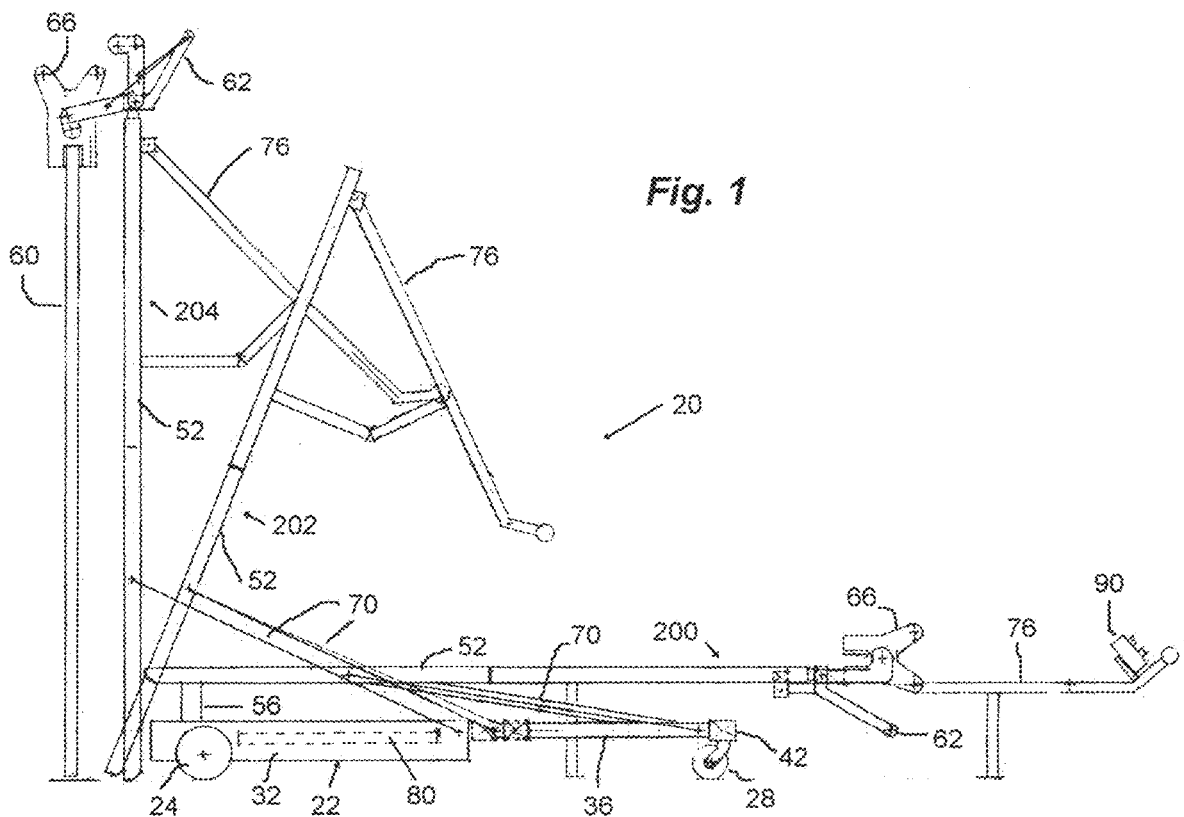
FIG. 1 is a left side elevation view of the panelized wall installation cart according to the present invention in the installation position, lifting position and transport position.
Figure 2:
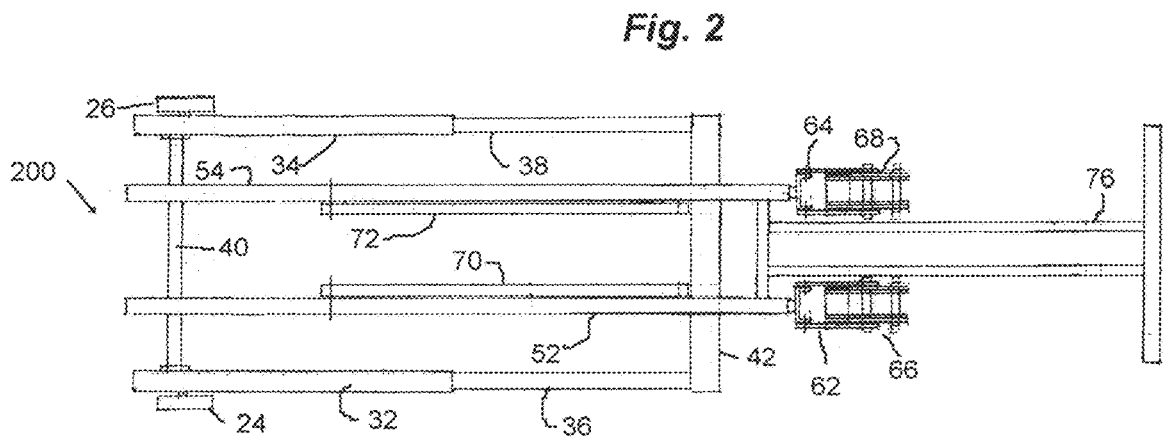
FIG. 2 is a top plan view of the cart of FIG. 1 arranged in the transport position showing the panel guide rails resting on top of the cart frame and the operator handle extended rearward.
Figure 3:
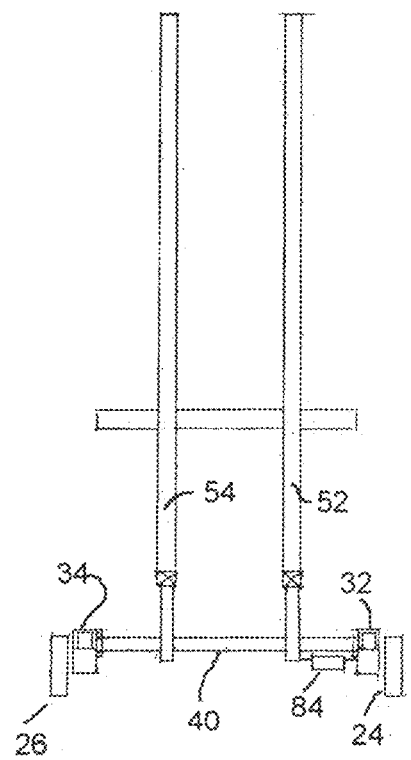
FIG. 3 is a front side elevation view of the cart of FIG. 1 in the installation position, showing the left and right panel guide rails slidably positioned on a cross member positioned between the right and left cart frame rails.

Now referring in greater detail to the various figures of the drawings wherein like reference characters refer to like parts, there is shown in FIG. 1, is a first embodiment of the present invention, a panelized wall installation cart, shown at 20, suitable for transporting, lifting and vertically installing panelized wall elements. Referring to FIGS. 1-3, the cart comprises a rectangular shaped cart frame assembly having a top, a bottom, a front, a rear and left and right sides, disposed horizontally with respect to the ground support by left 24 and right 26 cart wheels fixed to both the right and left sides near the front of the cart frame assembly 22 and left 28 and right 30 caster wheels fixed to the bottom near the bottom of the cart frame assembly 22. The front portion of the cart frame assembly 22 further comprises left 32 and right 34 tubular housing assembly each respectively and slidably receiving the left 36 and right 38 extension elements of the rear portion of the cart frame assembly 22. The rear of the cart frame assembly 22 is formed by a rear cross support assembly 42 with the rear ends of the extension elements 36 and 38 perpendicularly fixed to the rear cross support assembly 42. The front ends of the extension elements 36 and 38 are slidably disposed and received by the front portion of the cart assembly 22 wherein the cart frame assembly 22 longitudinal length is adjustable. The front of the cart frame assembly comprises a front cross guide bar 40 fixing the left 32 and right 34 front portions of the cart frame assembly 22 together.

A panel frame assembly comprises a left 52 and a right 54 panel guide rail with left and right guide rail supports 56 and 58 disposed near the bottom of the panel guide rails 52 and 54 and extending to the cross guide bar 40. The guide rail supports 56 and 58 have fittings to grasp the cross bar 40 wherein the fittings are rotatable around the cross bar 40 and slidably along the length of the cross guide bar 40 thusly facilitating horizontal positioning of the panel guide rails to operator selectable positions along the cross guide bar 40 whilst also providing rotation around the cross guide bar 40 to facilitate rotation of the panel guide rails from a horizontal transport position, through a lifting position and to a vertical installation position.

Again referring to FIGS. 1, a user provided panelized wall element is shown at 60 being grasped at the top end of the panelized wall element by the left 66 and right 68 panel clamps rotatably fixed to left 62 and right 64 clamp levers centrally pivotally fixed respectively to the top ends of panel guide rails 52 and 54. The clamp levers 62 and 64 are rotatable around the central pivot point facilitating moving the panelized wall element away from the panel guide rails 52 and 54 whilst lowering the panelized wall element so as to position the panelized wall element for installation.

Near the bottom end of the panel guide rails 52 and 54 have guide rails 56 rotate around the front cross guide bar 40 as the panel guide rails 52 and 54 from the loading position 200, through the lifting position 202, and then to the vertical installation position 204 by means of left and right lifting struts 70 and 72 respectively and pivotally fixed at the lifting strut distal ends to the panel guide rails 52 and 54. The proximate ends of the lifting struts 70 and 72 are slidably and rotatably attached to the rear support assembly 42. The rear support assembly 42 further comprises a rear cross guide bar similar in construction to the front cross guide bar rotatably and slidably receiving the distal ends of the lifting struts 70 and 72. The front and rear cross guide bars having rotatable and slidable attachment to the lifting struts and panel guide rails facility side to side lateral positioning of the panel guide rails for installing the panelized wall element. Side to side lateral positioning may optionally be facilitated by a motor driven lateral positioning apparatus 84, in FIG. 3, being a motor driven cable, chain or linear actuator, or alternately a hydraulic cylinder disposed between the cart frame assembly and the panel guide rails.

With the rear portion of the cart frame assembly extended as in the loading position 200 the lifting struts 70 and 72 provide for the panel guide rails to be horizontally positioned. In the loading position 200 a user provided panelized wall element is positioned on the left and right panel guide rails 52 and 54 and the panel clamps 66 and 68 are secured to the top of the user provided panelized wall element. As the panel guide rails 52 and 54 rotate to the lifting position 202 utilizing operator handle assembly 76 rotatably fixed near the top ends of the panel guide rails 52 and 54, the extension elements 36 and 38 are drawn into the tubular housing assemblies 32 and 34 by the lifting struts 70 and 72 thereby shortening the longitudinal length of the cart frame assembly 22. Whilst in the lifting position 202 the operator may maneuver the cart to the installation location. As the panel guide rails 52 and 54 rotate to the final vertical installation position 204, the extension elements 36 are further drawn into the tubular housing assemblies 32 and 34 thereby further shortening the longitudinal length of the car assembly 22. Manually lifting the panelized wall element into the vertical installation position 204 is assisted by a motor driven longitudinal positioning apparatus 80 being a rack and pinion within and an element of the tubular housing assembly. The rack is fixed to the front end of the extension element and received by a motor driven pinion. Alternatively the motor driven longitudinal positioning apparatus 80 may be a sprocket and chain, linear actuator, or hydraulic cylinder fixed to the front end of the extension element.

Referring to FIG. 1, for convenience an operator interface panel 90 affixed to the operator handle assembly is provided to control the various powered elements of the cart including the longitudinal position apparatus 80 motors, the positioning of the clamp levers 62 and 64, the panel clamps 66 and 68, and the side to side panel lateral positioning apparatus 84 motors.

Figure 4:
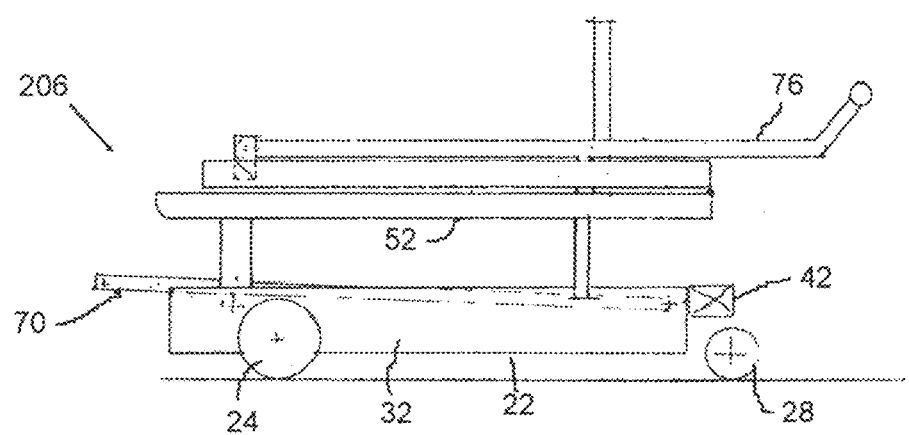
FIG. 4 is a left side elevation view of the cart in a collapsed configuration for transport of the cart.

Referring to FIG. 4, articulations in the panel guide rails and operator handle assembly as well as detachable fittings on the lifting struts are provided to fold the cart into a transportable size. The cart in the collapsed transportable configuration is shown at 206.

I claim the following:

1. A panelized wall installation cart, comprising a cart frame assembly having a top, bottom, front, rear, left and right sides having a rectangular shape, having wheels affixed to the bottom of the cart near the front and rear with the left and right side, and having a front tubular housing assembly and a front cross guide bar forming the front and a rear support assembly with extensions slidably received by the front housing assembly forming the rear, the tubular housing assembly having at least one motor driven longitudinal positioning apparatus receiving the extensions from the rear support assembly, at least two panel guide rails having top and bottom ends, the bottom ends slidably and rotatably affixed to the front cross guide bar and each having a clamp lever pivotally fixed to the top end of each rail, at least two lifting struts having proximate and distal ends, the proximate end rotatably and slidably disposed on the rear support assembly, the distal end pivotally disposed along the panel guide rail, a panel clamp pivotally affixed to the clamp lever; and, an operator handle assembly attached to the panel guide rails.

2. The panelized wall installation cart of claim 1 further comprising a user interface providing controls to power the cart fixed to the operator handle assembly.

3. The panelized wall installation cart of claim 1 further comprising a motor driven lateral positioning apparatus disposed between the side of the cart frame assembly and the panel guide rail facilitating the side to side positioning of the panel guide rails.

4. The panelized wall installation cart of claim 1 wherein the motor driven longitudinal positioning apparatus is a rack and pinion.

5. The panelized wall installation cart of claim 1 wherein the motor driven longitudinal positioning apparatus is a hydraulic cylinder.

6. The panelized wall installation cart of claim 1 wherein the motor driven longitudinal positioning apparatus is a linear actuator.

7. The panelized wall installation cart of claim 1 wherein the motor driven longitudinal positioning apparatus is a sprocket and chain.

* * * * *